(12) United States Patent
Gaspari

(10) Patent No.: US 6,414,906 B1
(45) Date of Patent: Jul. 2, 2002

(54) ELECTRONIC GAME CALL

(76) Inventor: Art Gaspari, 4717 Kutztown Rd., Temple, PA (US) 19560

( * ) Notice: Subject to any disclaimer, the term of this patent is extended or adjusted under 35 U.S.C. 154(b) by 0 days.

(21) Appl. No.: 09/725,388

(22) Filed: Nov. 29, 2000

(51) Int. Cl.[7] .............................. H04B 1/02; A63H 5/00

(52) U.S. Cl. ..................... 367/139; 340/384.7; 446/397

(58) Field of Search ...................... 367/139; 340/384.1, 340/384.4, 384.6, 384.7; 43/17; 446/179, 207, 208, 209, 397

(56) References Cited

U.S. PATENT DOCUMENTS

| 4,896,305 A | * | 1/1990 | Gimbal ........................ 367/139 |
| 4,922,468 A | * | 5/1990 | Menezes ...................... 367/139 |
| 5,349,774 A | * | 9/1994 | Parra ........................... 367/139 |
| 5,964,054 A | * | 10/1999 | Galfidi, Jr. ..................... 42/90 |

* cited by examiner

Primary Examiner—Ian J. Lobo
(74) Attorney, Agent, or Firm—Mitchell A. Smolow; Carmen Santa Maria

(57) ABSTRACT

The present invention relates to an electronic game caller comprising a means for receiving a power source in conductive connection with a digital recording circuit; the digital recording circuit in conductive connection with at least one digital vocalization storage medium; the digital vocalization storage medium in conductive connection with a user programmable microcircuit, wherein the programmable microcircuit is encoded with instructions for a predetermined sequence of playback and a predetermined pitch, tempo and volume, the programmable microcircuit in conductive connection with a digital playback circuit; the digital playback circuit in conductive connection with at least one digital playback altering circuit; the digital playback altering circuits in conductive connection with a first amplifier in conductive connection with a first speaker; a transmitter in conductive connection with the digital playback circuit; a remote receiver in conductive connection with a second amplifier in conductive connection with a second speaker and a means for receiving a second power source; and, at least one connected input control. In other, economy forms, any or all of the digital recording circuit; programmable circuit; or remote receiver and second speaker are omitted. The method of producing the electronic call is also claimed.

18 Claims, 4 Drawing Sheets

ELECTRONIC GAME CALL

FIELD OF THE INVENTION

The present invention relates generally to a device for use in hunting wild game and water fowl, and more particularly to an improved variably adjustable electronic game call.

BACKGROUND OF THE INVENTION

Throughout history, hunters and outdoorsmen have employed various devices to attract their prey. In particular, devices to mimic the calls of deer, moose, elk, water fowl, bear, turkey, and other wild game have been employed. Animal calls have also been employed by animal enthusiasts, wildlife photographers, recreational outdoorsmen and outdoor researchers in non-consumptive wildlife activities.

Rattling horns have been used to call wild game, for example deer. These rattling horns have traditionally been both large and small in size. Large rattling horns have the advantage of producing calls of greater volume, and thus are able to travel long distances and/or penetrate thick cover. However, these large horns are difficult to transport due to their size and bulkiness. Often hunters employ a string or strap tied around the horn and slung over their head, thereby offering the potential for entanglement as the hunter travels through brush or woods. Additionally, these large horns present a safety risk in that other hunters may see the movement of the horn and shoot at the moving horn without first ascertaining that the horn is attached to a hunter and not wild game.

Smaller horns have also been employed to combat the size and bulkiness problems. However, smaller horns do not produce the volume of larger horns, therefore, the sound does not travel as well. Smaller horns are also often transported using a string or strap slung over the head presenting the same potential for entanglement.

Other methods employed to call wild game have included rattling bags which are small bags filled with bone chips or other hard material, grunt calls which are mouth operated and employ air and/or grunt sounds blown through the device, and treadle operated sounding devices. Grunt calls use a reed to produce their sound and must be disassembled to adjust a rubber O-ring in order to vary the sound. Treadle operated sounding devices require the hunter to step on a treadle, and thus restricts the hunters movement.

Rattling bags, by design, require excessive movement, which may alert the prey. After repeated use of a mouth call on a cold day, the hunter's breath condenses in the call tubing or unit, creating moisture and rendering the call useless. Treadle operated sounding devices not only require excessive movement, they restrict the mobility of the hunter.

Bow hunters have employed techniques such as rattling an aluminum arrow against the wooden riser of the bow to call their intended prey. Today, however, the majority of compound bows are manufactured entirely from aluminum, composite or other lightweight metal.

A disadvantage of the aforementioned methods of calling prey is that they are very technique sensitive. As a hunter's skill at shaking, rattling, grunting, or blowing improves, his ability to successfully call and attract his prey increases. Both novice hunter and expert often have difficulty creating realistic sounds and are frustrated in their attempt to call the prey. Additionally, all of these mechanical calls require significant movement on the part of the hunter and this movement often frightens away the prey.

In response to the limitations of mechanical calls, electronic game calls have been developed. One such electronic game call is comprised of a tape recorder, amplifier, and a loudspeaker. A battery supplies the necessary power to give portable operation to the calling system. In one form, there is a digital sound synthesizer that stores a plurality of non-alterable game calls in digital memory. Other digitally recorded electronic game calls have the ability to allow the hunter to selectively choose among different non-alterable animal calls.

Still another electronic game call is used to distract an animal. The invention comprises a transmitter apparatus, an electronic transmitter circuit which includes an oscillator mechanism, an amplifier mechanism, and a receiver apparatus. A frequency selection mechanism allows the hunter to choose one of four radio signals at a selected frequency or frequencies for use. The casing and receiver circuits are positioned at a location remote from the transmitter apparatus. To operate the call, a hunter places or throws the receiver apparatus up to a distance of 70 yards away. When a game animal approaches and is in the area of interest, the transmitter apparatus is activated by the hunter, and a signal is generated that allows the receiver apparatus to transmit an audible non-alterable sound to distract the animal.

Still another electronic game call utilizes a magnetic tape to record animal sounds. Solar cells or DC batteries power a recording and playback organization controlled by circuitry ranged within the device to enable recording of animal sounds along a predetermined frequency band. The non-alterable sounds are subsequently played back for the attraction of the animal.

While these electronic game calls are not as dependent upon the skill level of the hunter as are the mechanical game calls, these game calls have a non-alterable sound that may not be easily modified to accommodate differing hunting conditions. A skilled hunter will want to modify or alter specific call sounds as hunting conditions change.

A skilled hunter tries to keep his movement to a minimum. Mechanical calls that need to be shaken or opened to adjust an internal rubber O-ring on a reed create noise and movement. Calls that require grunting or blowing are limited in their sound range. Additionally, the hunter's physical condition and breathing patterns (as when they are winded from walking) often do not allow for proper vocalizations, frightening or confusing the prey. Adverse weather conditions, such as cold temperature and rain, affect the hunter's ability to produce accurate calls when using a grunt or blow, as does excess salivation caused by hunter excitement.

Consequently, hunters frequently carry multiple calls, at increased expense, usually slung around their neck or carried in pockets and fanny packs. Reaching for the desired call creates excess movement, alerting the prey. Fumbling for the call when the hunter is excited (as often happens when he spots his prey) or when the weather is cold or when it is dark often results in a dropped call. This presents added problems when the hunter is in a tree stand. Multiple calls clanging against one another as the hunter moves will often alert the prey and or interfere with the hunter's aim.

What is needed is an improved electronic game call that is convenient to use, requires minimal motion and noise by the hunter, is easily transportable, allows for multiple calls that accurately mimic the prey, and gives the hunter the ability to modify the sound produced in response to local conditions.

SUMMARY OF THE INVENTION

The present invention provides an improved game call for use by hunters which allows for the digitalization of actual animal vocalizations, allows for multiple and/or simultaneous calls and user controlled sequencing within one unit, provides the ability to use numerous types of calls within one unit, provides the ability to independently and electronically adjust the tempo, pitch, and volume, provides the ability for the user to record in the field, uses a high fidelity speaker system, and is relatively low cost, light weight, and easily mountable on the hunter's weapon, clothing, or body.

In one form, the present invention comprises in conductive combination a means for receiving a first power source; a digital recording circuit; a digital storage medium; a programmable microcircuit to control a predetermined playback sequence; a digital playback circuit; a digital playback altering circuit for altering the recorded vocalizations on playback; a first speaker to audibly play the vocalizations; a transmitter to transmit the vocalizations; a remote receiver in combination with a second speaker and second power source to receive and audibly play the transmitted vocalizations; a conductive connection to electrically connect the components; and, at least one conductively connected input control.

In other, economy forms, any or all of the digital recording circuit; programmable circuit; or remote receiver and second speaker are omitted.

An advantage of the present invention is that use of the call produces no extraneous noise to alert the prey. The hunter does not need to fumble around in his pocket, backpack, or fanny pack trying to select the proper call needed for varying conditions. Any call needed is instantly accessible with a finger touch because the invention is mounted in an easily reached location, for example on the bow, gun, or an arm or a leg.

Another advantage of the present invention is the consistency of calls. After repeated use of a call, for example a mouth call, or on a cold day, the hunter's breath condenses in the call tubing or unit creating moisture and rendering the call useless. Additionally, the salvia in the hunter's mouth tends to create moisture within the call, particularly when the hunter is excited. The present invention is contained within a sealed and water resistant case, thus avoiding the moisture problem. A totally enclosed water resistant unit produces the same accuracy of call time and again.

Still another advantage of the present invention is to provide near instantaneous reproducible and realistic call vocalizations. Mechanical calls are largely influenced by hunter technique. Voice calls for example, may produce less than optimal vocalizations if the hunter is winded by for example, hiking or running through the woods, suffering from an upper respiratory infection, or overly excited at seeing a trophy prey. Electronic game calls that rely on for example, tape recordings may not provide reproducible calls if for example, the tape becomes stretched or the power source becomes low causing alterations in tape playback speed. Additionally, tape does not have the ability to repeat the same call in a near instantaneous manner unless it has been pre-recorded that way.

Still another advantage of the present invention is the ability to vary the call sequence or actual call sound to suit varying localized hunting conditions. By modifying the tone, pitch, or volume and/or instantaneously switching from one call to another, and/or playing a plurality of calls simultaneously, realistic localized call sequences can be reproducibly delivered.

Still another advantage of the present invention is the cost savings achievable with the purchase of only one multi-function call rather than a plurality of game calls each producing only one specific sound.

Other features and advantages of the present invention will be apparent from the following more detailed description of the preferred embodiment taken in conjunction with the accompanying drawings which illustrate, by way of example, the principles of the invention.

DETAILED DESCRIPTION OF THE INVENTION

As used herein, the term "in conductive connection" refers to the ability to be electrically connected to a component upon the circuit and/or the component being energized, for example, by being switched on. Furthermore, "conductive connection" or "connection" also includes the terminals, for example, clips or posts, and wiring, for example, leads or circuit boards to allow conductivity between components.

In accordance with a preferred embodiment of the invention, an improved electronic game call is provided. In one, preferred form, the device comprises a housing containing, in conductive combination, a power source; a digital recording circuit to record the animal vocalizations; a recording activator to activate the recording circuit; a digital storage medium to store the recorded animal vocalizations; a programmable microcircuit; a digital playback circuit; at least one digital altering circuit for altering the recorded vocalizations on playback; a playback activator for activating the playback circuit and a speaker to playback the vocalizations. The unit is light in weight for hunter convenience, preferably less than about eight ounces. The greater the weight, the greater the adverse affect on weapon stability, for example, when holding a bow back at full draw.

While optional, it is desirable that the housing be rigid or a semi-rigid encasement to enhance rigidity and inhibit straining of the device. The housing is manufactured from water resistant material such as for example, plastic, stainless steel, aluminum, rubber coated metal, fiberglass and the like to an ergonomic shape. Optionally, the shape of the housing may be contoured to comfortably fit a hunter's body part, for example an arm or a leg, or it may be contoured to fit a mountable area of a weapon, for example, a rifle, a bow, or a cross-bow. It may be camouflaged, dark in color, or otherwise manufactured to reduce visibility, and is capable of both protecting the components during, and withstanding, extreme weather, as well as, seasonal and environmental conditions, for example frigid cold, high heat, heavy rain, fog, blizzards, and the like.

Figure 1:
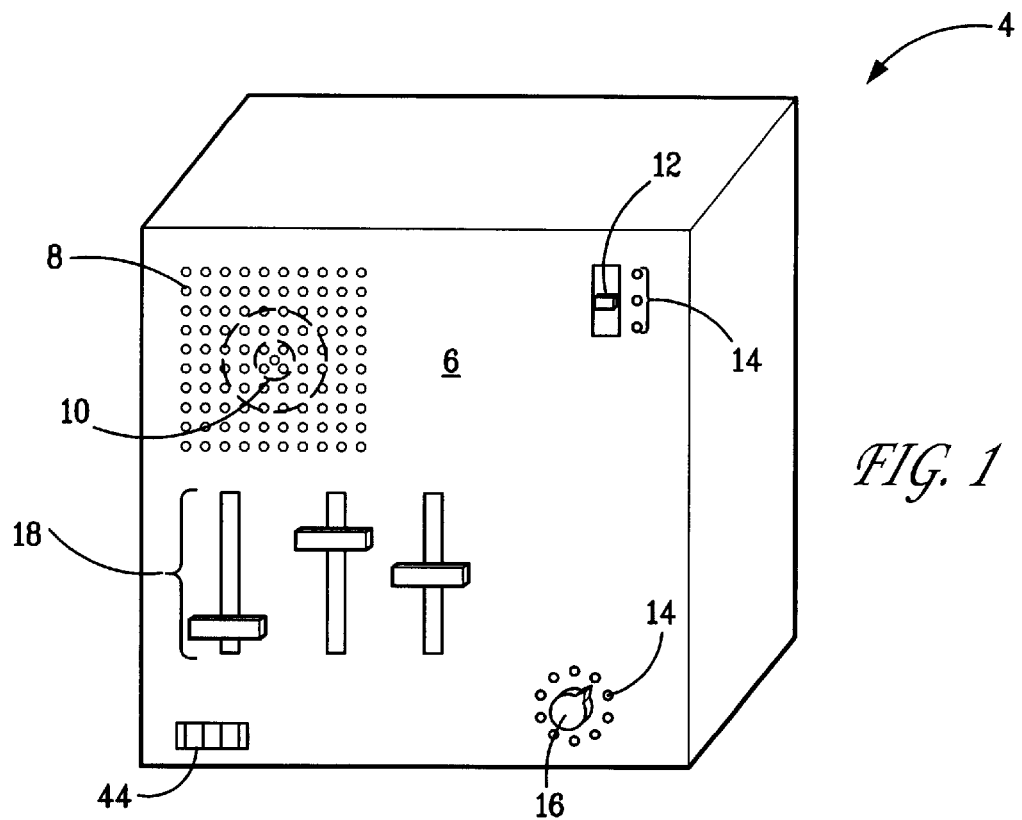
FIG. 1 is a frontal view of the improved electronic game call of the present invention.

Referring now to FIG. 1, the housing 4 is a contoured box generally rectangular in shape, and generally small enough in size to be easily portable, for example, small enough to mount on a weapon or on the user. The box may be contoured to fit for example, a bow, a rifle or a limb of the hunter. The front plate 6 of the box contains perforations 8 behind which is located a speaker 10. Preferably, the speaker is a high fidelity speaker to achieve the most authentic and realistic animal vocalizations.

Located on the front plate 6 is a power switch 12 and an associated LED 14 or other power indicating display. Optionally, the remote LED has the ability to be obscured so as to not alert the prey. The power switch 12 has détentes for power off, power on, standby, record, playback and pause. This switch may be, for example, a rotating knob, a sliding knob or switch, a button or a microswitch. The standby mode is a power conserving mode in which only selective electronic components are energized to allow for "instant on" without the need for a warm up period. The power indicating display, through appropriate circuitry, will show the power state, for example, green for on, red for record, amber for standby and blinking for a low power state.

Alternatively, a power switch and associated power indicating display controls power on, standby and off, while a separate switch and associated function indicating display controls record, playback and pause functions. It should be appreciated that while in the preferred embodiment the switch 12 or switches are located on the front plate 6, the specific location of any one control on the housing is not critical, nor need all the controls be located on the same housing surface 4.

The tempo, pitch, and volume may be varied through at least one digital playback altering circuit. Control inputs 18 may be at least one conductively connected input control for example, rotating knobs, sliding tabs, step incremented buttons, and the like. Optionally, tempo, pitch and volume indicating displays are provided, for example a series of LEDs or a display screen.

A selector 16 for selecting a specific animal vocalization is also provided. This may include a rotatable knob with predetermined selectable stops, individual buttons, a key pad, or a touch pad. The buttons and knob may be rubber coated. Optionally, an LED 14, display screen or other indicating display is associated with each selectable position. In the preferred embodiment, there are at least eight selectable positions for pre-recorded vocalizations and at least two positions for recordings of vocalizations made in the field. However, it should be appreciated that there are no set minimum or maximum number of pre-selected positions, hence no minimum or maximum number of vocalizations available for playback, the number being determined by the size of the unit and the circuitry contained therein. Furthermore, although the aforementioned controls have been described as being on the front plate 6 of the present invention, the controls may be located on any surface of the device, or may be split among any number of surfaces.

Rather than mechanical or electromechanical controls, input may be achieved via a touch pad or touch screen. Utilizing the programmable circuitry, for example, software or firmware, a single input device for example, a touch screen, a key pad or touch pad along with an associated display screen can be utilized to input all desired variables, i.e. playback selection and sequence and/or tone, pitch and volume settings.

Figure 2:
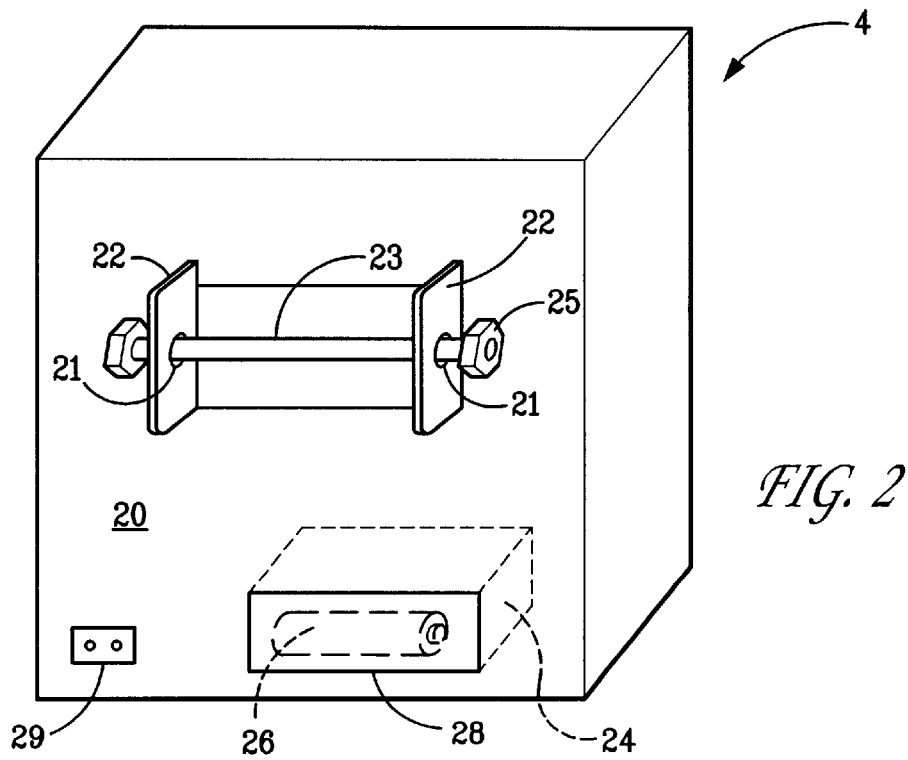
FIG. 2 is a rear view of the improved electronic game call.

Referring now to FIG. 2, the back plate 20 of the unit contains an attachment 22 for mounting the unit to for example, a rifle, a bow, a cross-bow, or other weapon, as well as to an article of the hunter's clothing or to the hunter himself for example, an arm or a leg or to piece of photographic equipment, for example a camera or tripod. In the present invention, mounting brackets are employed, although other attachments 22 such as for example, hook and loop straps, such as Velcro, or an elastic band containing a button and a snap may be employed.

Located on one surface of the device, preferably the rear surface, is an access plate 28 covering a compartment 24 for a battery or other power source 26. The compartment contains conductive receiving points (not shown), for example, metallic connectors. This compartment 24 should be water resistant for example, by utilizing a rubber, plastic, or other pliable gasket between the housing body 4 and access plate 28. Alternative to, or in addition to the compartment 24, the housing body 4 may contain conductive receiving points 29, for example metal screws or jacks, to receive power from an external power source, for example, an external battery, an external solar cell or a motor vehicle cigarette lighter. Because the playback is of generally short duration, drawing relatively small amounts of power, the power source 26 can be generally small in size, yet produce enough power to activate the unit for extended periods, for example 14 hours, even in cold climates.

Figure 3:
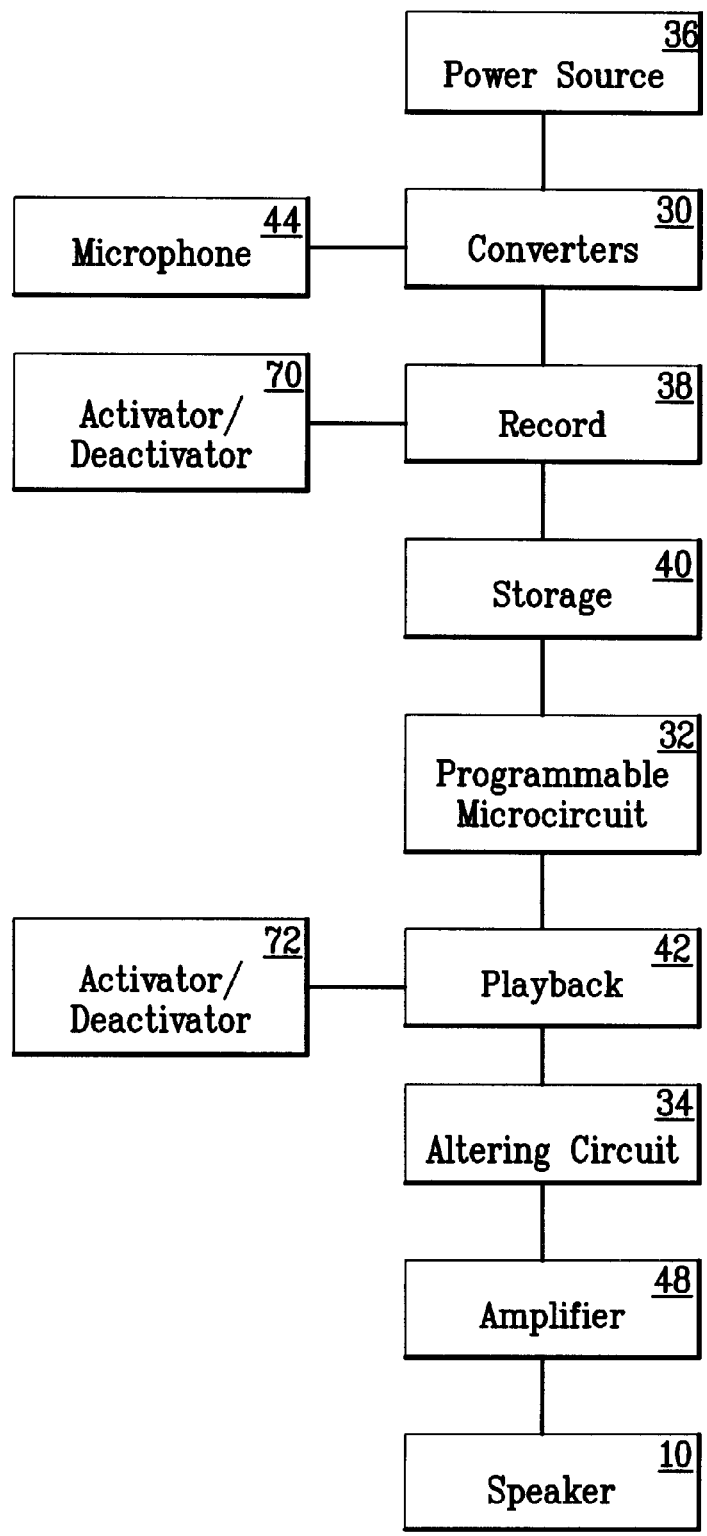
FIG. 3 is a block diagram of the electronic components of the improved electronic game call.

Referring to the block diagram of FIG. 3, the housing 4 contains a suitable material to hold the various components for example, a board, a wafer, or other substrate material suitable for circuits. The integrated circuitry includes one or more converters 30 for coding internal or external signals. The converters 30 are digital converters for coding internal and external digital signals. The integrated circuit further includes, in conductive connection, a digital recording circuit 38; at least one digital data storage medium 40; a programmable microcircuit 32 encoded with instructions for sequencing the order of playback and/or alteration of the pitch, tempo and/or volume of the vocalizations, for example, software or firmware; digital play back circuitry 42; circuitry to alter the pitch, tempo, and/or volume of a recorded vocalization 34; an amplifier 48 a speaker 10, preferably a high fidelity speaker; and a power source 36. The components are commercially available and/or can be fabricated.

The recordation is accomplished using a digital recording circuit utilizing, for example, a recording activator 70 such as a button or switch conductively connected to a microphone 44 encased within the housing, or externally placed and conductively connected to the housing 4 via a wire and jack or through electromagnetic transmissions. The recording activator 70 functions as an on-off switch. Alternatively, the recording circuit may be voice activated. The microphone 44 transmits the vocalization to the digital converters which convert the signal to digital form. Utilizing a read/write head or heads (not shown), the digitized recorded vocalizations are transferred to at least one digital storage medium 40.

During playback, the digitized vocalizations are read from the storage medium and passed through known circuitry to an amplifier 48 and speaker 10. The digital playback circuitry is conductively connected to a playback activator 72, for example, a button or switch, which functions as an on-off switch. Alternatively, the playback may automatically terminate after the playing of one cycle or after receiving an end of play signal. One cycle is, for example, one vocalization or one user specified vocalization sequence.

Data storage is accomplished using known data storage devices available to store digital data, for example, magnetic tape, magnetic discs, data memory chips, and optical discs. Factory supplied, permanently recorded vocalizations may also be stored in read only memory (ROM) chips. Optionally, the ROM chips are interchangeable by the user. At least one, preferably, at least eight prerecorded actual animal vocalizations are stored in read only memory (ROM). Additionally, vocalizations, preferably at least two actual vocalizations, are able to be recorded and re-recorded, as necessary in the field by the hunter and stored as described above.

The circuitry used to alter the pitch, tempo or volume is circuitry known in the art. This circuitry allows for independent, individual control of all three. The pitch, tempo, and volume may be controlled in real time during playback and/or they may be pre-programmed into a hunter predetermined playback sequence. For example, the hunter may program a buck grunt into a buck snort into a wheeze, in sequence.

The programmable microcircuit 32 allows the hunter to input by, for example, a keypad, touch pad or touch screen, specific playback instructions. The hunter may, for example, sequence a predetermined number of different calls each having a distinct and separate pitch, tone and volume setting. Alternatively, the hunter may program a single call to play and/or a plurality of calls to simultaneously play a repeated predetermined number of times, each time having a different pitch, tone or volume. It should be appreciated that the number of different possible combinations is nearly limitless.

The speaker 10 is preferably a high fidelity speaker to create more realistic and accurate vocalizations.

The invention has electrical contacts to receive a power source, either internal or external to the invention, for example, a battery, either rechargeable or non-rechargeable; a solar cell; a discharging capacitor; or any other device capable of providing constant uniform power.

In use, the present invention operates as follows. Prior to going into the field, the hunter predetermines a plurality of pre-recorded vocalizations, preferably at least eight pre-recorded vocalizations. These pre-corded vocalizations are then made accessible for playback. The predetermined vocalizations may be burned into ROM memory at the factory, or they may be loaded into data storage memory by the hunter, for example, by linking and downloading information from a personal computer, by accessing a magnetic disc, data memory chip, or optical disk containing the selected vocalizations, or alternatively actual vocalizations may be recorded by the hunter for use.

Once in the field, the hunter has the additional ability to record a plurality of actual animal vocalizations, preferably at least two additional, actual animal vocalizations using either the internal or external microphone 44. This ability to record actual vocalizations in the field gives the hunter the ability to record sounds specific to localized conditions and prey.

When the hunter desires to play an animal vocalization, he depresses the appropriate button or rotates a knob 16 to a pre-selected position, thereby determining which recorded vocalization will play. Utilizing the volume, tempo, and pitch adjustments 18, the hunter has the ability to alter the vocalization to suit the hunter's specific preferences. Using the programmable features of the present invention, the hunter may store the specific tempo, pitch and volume adjustment for repeated future use. Each customized and stored playback may be continually altered using the pitch, tempo and volume controls 18. Because the housing 4 is generally, small and portable, the user has the ability to use a finger to activate both the recording activator 70 and playback activator 72, with minimal extraneous movement. For example, the housing 4 may be mounted on a weapon (not shown) in a position to allow a finger on the user's weapon support hand to engage either activator 70, 72 without release of weapon support.

Because the vocalization is digitally recorded and stored, playback is virtually instantaneous. The hunter has the ability to repeat that single selected call for a predetermined number of cycles, or by inputting programmable instructions for example, by depressing multiple buttons in a predetermined sequence, rotating the knob to a predetermined sequential number of positions, or by utilizing a keypad or touchpad, the hunter may program a specific sequence of calls, a plurality of calls to play simultaneously, or both. This ability to program a nearly unlimited number of call sequences gives the hunter a powerful and useful tool heretofore unknown in the art.

In order to minimize unnecessary movement and noise, the housing unit 4 is positioned in a location convenient to the hunter such that activation and programming requires minimal movement by the hunter. For example, the housing may be mounted on a rifle, a bow, a cross-bow, or a musket, or the housing unit may be mounted to an article of the hunter's clothing and/or to the hunter himself, or to a piece of photographic equipment, such as a camera or tripod. The unit may be attached, for example, by hook and loop straps, such as Velcro, strap and buckles, pins, or utilizing mounting attachments 22.

In one form, as shown in FIG. 2, the mounting attachments 22 useful for mounting on a bow (not shown), comprise "U" shaped members. The "U" shaped attachment is removably attached to the back plate for example, using hook and loop, for example, Velcro, or a fastener, for example, a screw or bolt. Each leg 22 of the "U" attachment has a hole 21 which receives, preferably removably receives, a retaining bolt 23. Once the bow (not shown) is received within the two legs 22 of the "U" attachment, the retaining bolt 23 is passed through the holes 21 and a nut 25 is attached. The nut 25 is tightened, thereby constricting the two legs 22 of the "U" attachment securely against the received portion of the bow (not shown).

Alternatively, the holes may be replaced by slots, through which pass a hook and loop strap, such as Velcro, utilized to constrict the two legs of the "U" attachment. Other attachments include leather or elastic straps mated for fastening, for example with snaps, buttons or a buckle.

Figure 4A:
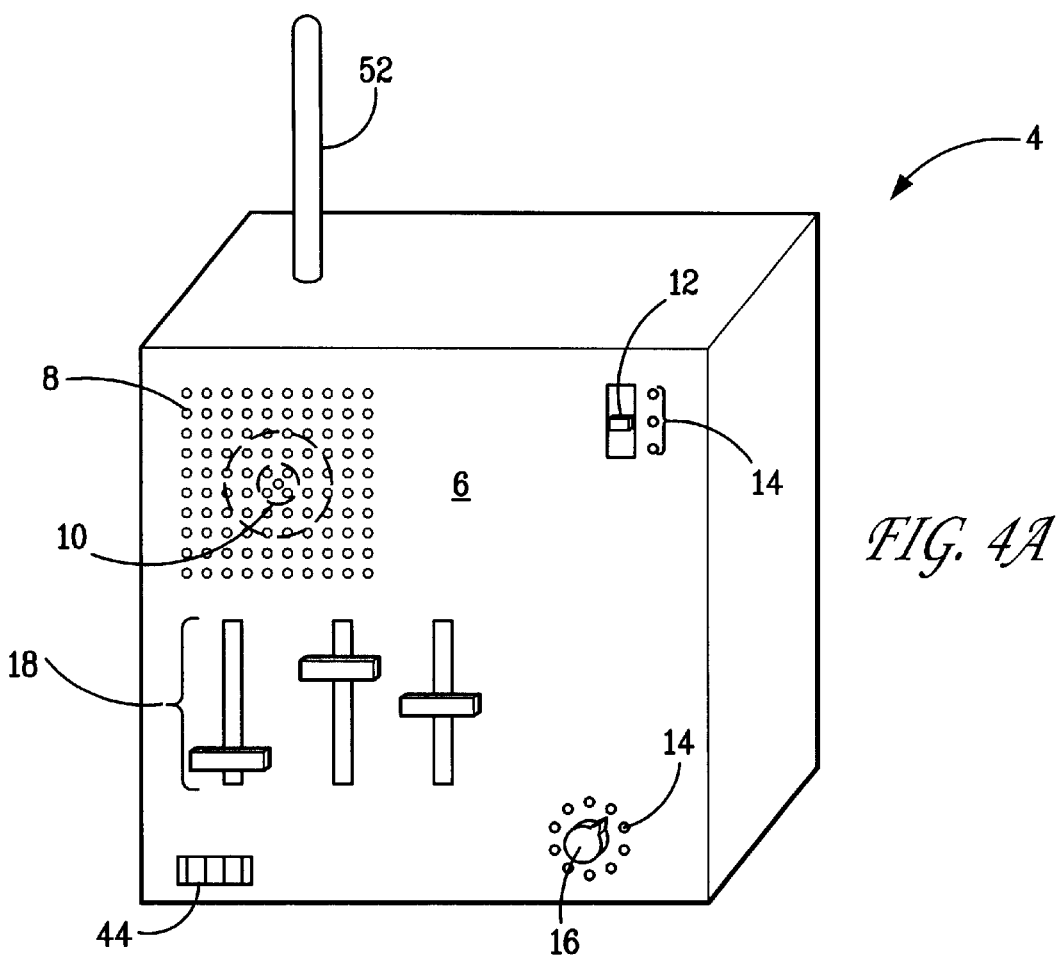
FIG. 4 is a view of a different embodiment showing a remotely located speaker.
Figure 4B:
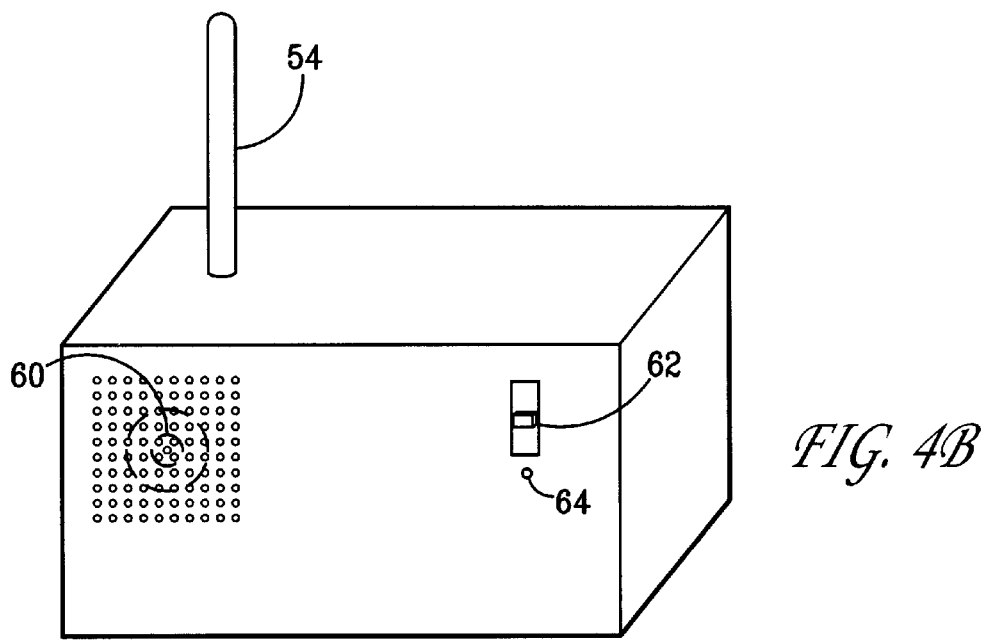
Figure 5:
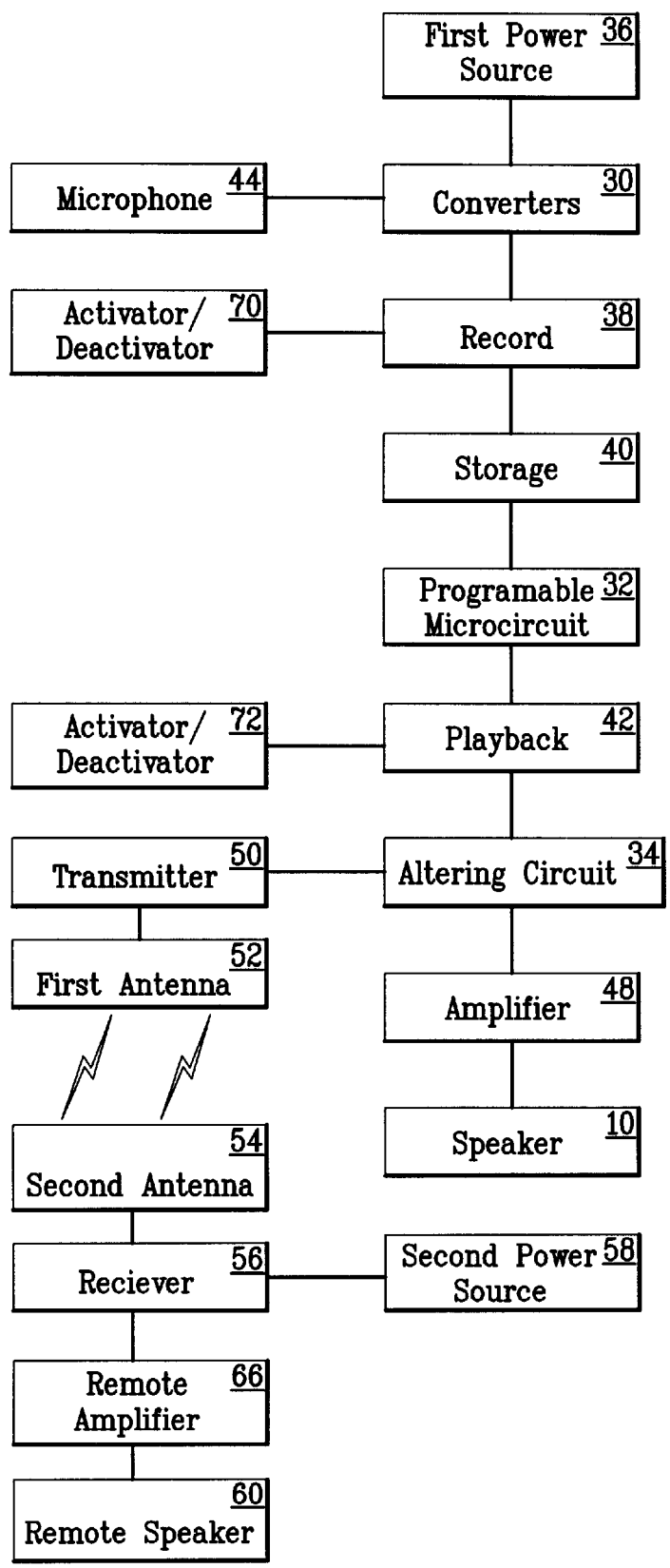
FIG. 5 is a block diagram of the electronic components of a different embodiment showing a remotely located speaker.

In a different form of the present invention as shown in FIG. 4 and FIG. 5, a transmitter 50 and a first antenna 52 are added to the circuitry encased within the unit. A second antenna 54 and a receiver 56, along with a second power source 58, remote power switch 62, remote power LED 64, and associated circuitry are electrically connected to a remotely located amplifier 66 and speaker 60. The housing unit power switch 12 has an additional switch setting to select an internal or remote speaker, or both, or alternatively, a separate internal/external switch whereby the hunter is able to choose between the internal speaker, the remotely positioned external speaker or both. The remote power LED 64 has the ability to be obscured, so as to not alert the prey.

An advantage of the external speaker is that the hunter may position himself in a location presenting a more ideal shot while the prey is attracted to the remotely located speaker. Alternatively, the unit may be programmed with vocalizations that frighten or warn the prey rather than attract the prey. Using the programmable features of the present invention, a sequence of calls may be programmed such that warning calls or sounds indicative of a natural predator emanate from the remotely positioned speaker while attracting calls emanate from within the internal speaker, such that the prey is directed away from the remotely positioned speaker and towards the internal speaker and the hunter. Alternatively, the hunter may manually reposition the internal/remote switch during playback as required by local conditions.

The adjustable pitch, tempo, and volume controls 18 allow for vocalization playback specific to local conditions. If the playback is too loud, the game may be frightened away. By adjustment of the volume an effective, adjustable range is maintained.

It should be appreciated that the length of individual vocalizations will vary greatly, but are generally short in duration. For example, a grunt may take about 1–2 seconds, while antler rattling may take up to about 30 seconds. Because actual animal vocalizations rather than simulated vocalizations are used, the present inventions provides increased reliability in attracting animals.

Although the present invention has been described in connection with specific examples and embodiments, those skilled in the art will recognize that the present invention is capable of other variations and modifications within its scope. For example, to gain economy, the programmable software or firmware may be omitted. Although omitted, the hunter would still be able to record and manually alter the pitch, tempo and volume on playback. While FIGS. 3 and 5 display one form of relationship between the individual components, it should be appreciated these figures are exemplar only, and that addition configurations are possible to achieve the desired alterable vocalization on playback.

These examples and embodiments are intended as typical of, rather than in any way limiting on the scope of the present invention as presented in the appended claims.

What I claim is:

1. An electronic game caller for reproducing animal vocalizations which comprises:
   a portable housing effectively capable of withstanding environmental extremes, removably attachable in an outdoor venue;
   a means for receiving a power source;
   at least one digital storage medium;
   means to connect the power source receiving means with the digital storage medium;
   a digital playback circuit;
   means to connect the digital storage medium with the digital playback circuit;
   at least one digital playback altering circuit;
   means to connect the digital playback circuit with at least one digital playback altering circuit;
   an amplifier;
   means to connect at least one digital playback altering circuit with the amplifier;
   a speaker;
   means to connect the amplifier with the speaker;
   at least one input control;
   means to connect at least one input control with at least one of the group consisting of the power source receiving means, the digital playback circuit and the digital playback altering circuit;
   the power source receiving means, digital storage medium, digital playback circuit, digital playback altering circuit, amplifier and speaker contained within the portable housing;
   at least one digital storage medium capable of holding at least one pre-selected animal vocalization of short duration;
   the digital playback circuit having an activation/deactivation means to activate/deactivate playback of at least one pre-selected vocalization upon receipt of a pre-selected input;
   the digital playback altering means capable of effectively altering at least one of the group consisting of pitch, tempo and volume of the stored vocalization to accommodate localized conditions and seasonal modifications;
   the speaker directionally broadcasting a sound wave; and
   at least one input control capable of receiving an input with an effectively minimal motion and noise by a user.

2. The electronic game caller of claim 1 further comprising a digital recording circuit and a means to connect the digital recording circuit between the power source receiving means and the digital storage medium, the digital recording circuit having an activating/deactivating means to activate/deactivate recording of vocalizations of short duration upon receipt of a pre-selected input.

3. The electronic game caller of claim 2 wherein at least one input control is selected from the group consisting of mechanical inputs, electromechanical inputs, a touch pad and a touch screen.

4. The electronic game caller of claim 2 wherein the power source receiving means receives power from a power source selected from the group consisting of a rechargeable battery, a non-rechargeable battery, a solar cell, and a discharging capacitor.

5. The electronic game caller of claim 2 wherein the digital storage medium is selected from the group consisting of magnetic tape, magnetic discs, data memory chips, optical discs, and read only memory (ROM) chips.

6. The electronic game caller of claim 2 wherein the digital recording circuit contains a microphone.

7. The electronic game caller of claim 2 wherein the speaker is a high fidelity speaker.

8. The electronic game caller of claim 2 further comprising a user programmable microcircuit and a means to connect the programmable microcircuit with the digital storage medium, the programmable microcircuit capable of being encoded with instructions for a predetermined sequence of playback and a predetermined pitch, tempo and volume.

9. The electronic game caller of claim 8 wherein the predetermined sequence of playback includes a plurality of vocalizations played simultaneously.

10. The electronic game caller of claim 8 wherein the programmable microcircuit is selected essentially from software or firmware.

11. The electronic game caller of claim 2 further comprising a transmitter; a means to connect the transmitter between the digital altering circuit and a first antenna; a remote receiver; a means to connect the remote receiver with a means for receiving a second power source; a second antenna; a means to connect the second antenna with the remote receiver; a remote amplifier; a means to connect the remote amplifier with the remote receiver; a remote speaker; and a means for connecting the remote speaker with the remote amplifier.

12. The electronic game caller of claim 2 wherein the portable housing is removably attachable to at least one of the group consisting of a rifle, a bow, a crossbow, a musket, a person, and photographic equipment.

13. The electronic game caller of claim 12 wherein the photographic equipment is selected from the group consisting of a camera and a tripod.

14. An electronic game caller for reproducing animal vocalizations comprising:
   a means for receiving a power source, in conductive connection with a digital recording circuit having an activating/deactivating means to activate/deactivate recording of vocalizations of short duration;

the digital recording circuit in conductive connection with at least one digital storage medium capable of holding at least one pre-selected animal vocalization of short duration;

the digital storage medium in conductive connection with a user programmable microcircuit, wherein the programmable microcircuit is encoded with instructions for a predetermined sequence of playback and a predetermined pitch, tempo and volume, the programmable microcircuit in conductive connection with a digital playback circuit having an activation/deactivation means to activate/deactivate playback of at least one pre-selected vocalization;

the digital playback circuit in conductive connection with at least one digital playback altering circuit capable of altering at least one of the group consisting essentially of pitch, tempo and volume of the stored vocalization;

the digital playback altering circuits in conductive connection with a first amplifier;

the first amplifier in conductive connection with a first speaker;

a transmitter in conductive connection with the digital playback altering circuits;

a remote receiver in conductive connection with a second amplifier, a second speaker and a means for receiving a second power source; and, at least one connected input control wherein the power source receiving means, digital recording circuit, digital storage medium, programmable microcircuit, digital playback circuit, digital playback altering circuit, transmitter, first amplifier, first speaker and input control are contained within a portable housing attachable to at least one of the group consisting essentially of a weapon, photographic equipment and a person.

15. A method for electronically calling game comprising the steps of:

a) digitally recording at least one actual animal vocalization of short duration to a digital storage medium contained within a portable housing attachable in an outdoor venue;

b) selecting a sequence of at least one of the pre-recorded vocalizations for playback;

c) effectively altering for playback to suit local conditions at least one of the group consisting of pitch, tempo and volume of the vocalization; and, d) replaying the altered vocalizations in the pre-selected sequence with an effectively minimal motion and noise by a user.

16. The method of claim 15 wherein at least one vocalization is played through a high fidelity speaker.

17. The method of claim 15 wherein the at least one vocalization includes a plurality of vocalizations played simultaneously.

18. The method of claim 15 further comprising the step of transmitting the played vocalization to a remotely located receiver, wherein the vocalizations are played through a first, internal amplifier and speaker and a second, remotely located amplifier and speaker.

* * * * *